United States Patent [19]

Meyers

[11] 4,226,005

[45] Oct. 7, 1980

[54] APPARATUS AND TOOL FOR CUTTING ANIMAL CARCASSES BY IMPINGING AIR JETS

[76] Inventor: William G. Meyers, R.R. #1, Gretna, Nebr. 68028

[21] Appl. No.: 32,012

[22] Filed: Apr. 20, 1979

[51] Int. Cl.³ .......................... A22B 5/16; A22C 17/04
[52] U.S. Cl. ....................................... 17/1 R; 17/1 G; 17/21; 17/51
[58] Field of Search .............................. 17/46, 1 G, 21; 30/123.3, 123.5; 83/177

[56] References Cited

U.S. PATENT DOCUMENTS

| 1,377,872 | 5/1921 | Callery | 17/21 |
| 1,484,618 | 2/1924 | Blades | 17/21 |
| 3,089,775 | 5/1963 | Lindall | 17/46 |
| 4,118,830 | 10/1978 | Weiland | 17/21 |

FOREIGN PATENT DOCUMENTS

| 537073 | 10/1931 | Fed. Rep. of Germany | 17/21 |
| 976093 | 10/1950 | France | 17/21 |
| 102019 | 11/1923 | Switzerland | 17/21 |
| 301032 | 1/1930 | United Kingdom | 17/21 |

Primary Examiner—Willie G. Abercrombie
Attorney, Agent, or Firm—George R. Nimmer

[57] ABSTRACT

Disclosed are apparatus including novel workman's tool for removing hides, select cuts of meat, and generally carving away from animal carcasses relative large portions in cleanly cutaway non-comminuted condition. The apparatus, manually wieldable workman's tool, is deftly employable in a manner analagous to a conventional honed butcherman's knife; however, the knifelike shank of the tool includes tiny orifices emitting compressed air jets of sufficiently high intensity to carve the animal carcass. The emitted air jets to effect carving are made relatively free of solid particles and excessive moisture thereby maintaining the integrity of the air jets and the cleanly cutaway noncomminuted condition of the removed carcass portions.

10 Claims, 7 Drawing Figures

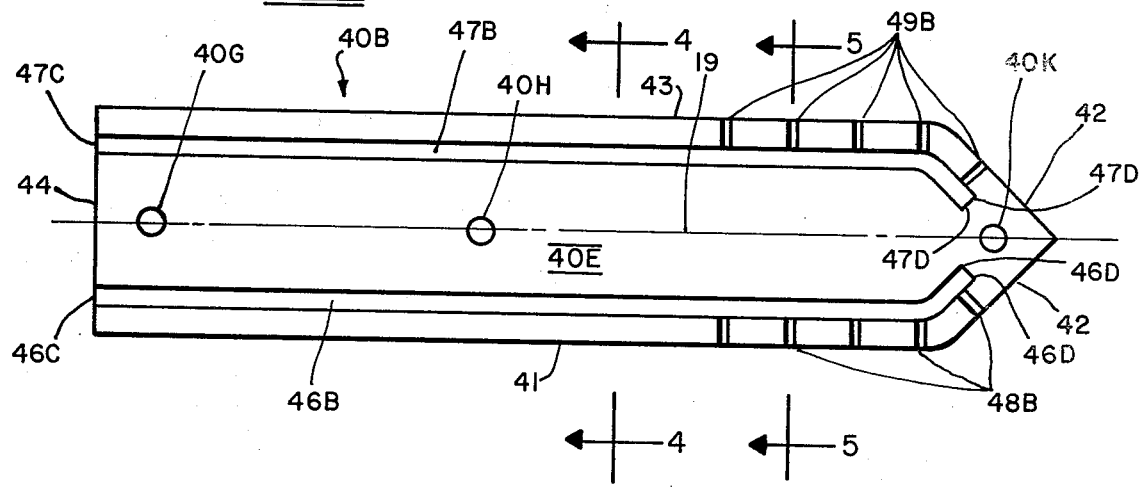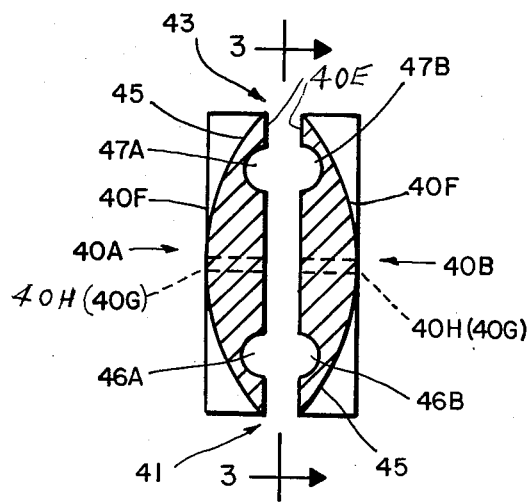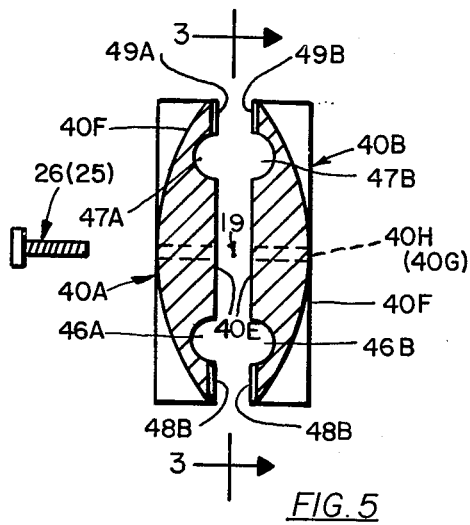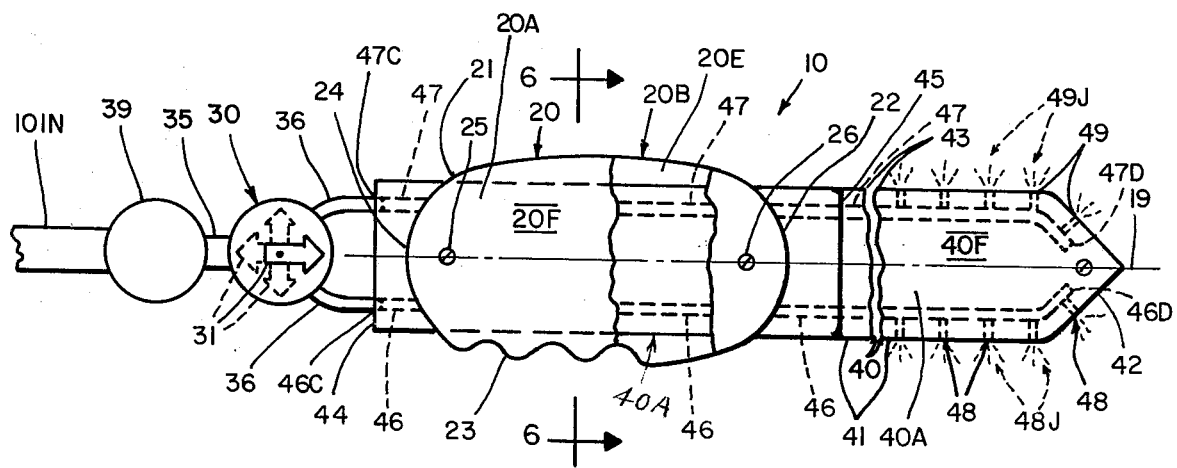

APPARATUS AND TOOL FOR CUTTING ANIMAL CARCASSES BY IMPINGING AIR JETS

The use of high intensity air jets for de-boning and otherwise removing portions from animal carcasses has been known in the prior art including U.S. Pat. Nos. 2,851,362; 3,089,775; 3,478,385; and 3,722,032. However, the aforelisted prior art relates to automated equipment rather than to a portable workman's tool that is manually deftly wieldable analagous to a conventional knife having honed cutting edges. Moreover, the meat or other carcass portion removed is apt to be in a jagged or comminuted condition and not as cleanly cutaway large portions. Though the workman's tool disclosed in U.S. Pat. No. 4,118,830 is portable and manually wieldable in its relatively cumbersome for the butcherman to become accustomed to and has only a limited supply of compressed gas to effect carcass cutting and is otherwise not suited for removing large chunky portions from successively presented animal carcasses.

It is accordingly the general objective of the present invention to provide improved apparatus and manual tools for carving animal carcasses by impinging air jets into relatively large non-comminuted chunky portions, intact hides, etc., the portable manually wieldable tool including a knife-like shank readily adaptable for use by personnel already accustomed to using honed butcherman's knives. It is an ancillary general objective to provide apparatus and air jets tools amenable for use in conventional slaughterhouse and carcass carving operations for a procession of successively presented animal carcasses and wherein the personnel might readily adapt themselves to the use of impinging air jets methods for cutting.

With the above and other objects and advantages in view, which will become more apparent as this description proceeds, the air jets carcass cutting apparatus of the present invention generally comprises an elongate flexible conduit extending remotely downstream from a reservoir of compressed air and, after proceeding through appropriate airstream treatment, terminates at the portable workman's tool, the tool including an elongate shank of knife-like shape extending lengthily forwardly of the tool manually wieldable handle, the carcass addressing elongate peripheral edge of the shank being provided with tiny orifices for emitting the high intensity air jets for impingedly cutting into the carcass, the airstream passageway extending interiorly along the shank and preferably as two sub-paths for independently supplying air to orifices of the shank lead-edge and trail-edge, and tool-valve means for selectively controlling the airstream.

In the drawing, wherein like characters refer to like parts in the several views, and in which:

FIG. 2 is a detail side elevational view of FIGS. 1 and 1A directed to the hand manipulatable workman's tool component;

FIG. 4 is an exploded sectional elevational view of the knife-like shank portion of the workman's tool taken along line 4—4 of FIG. 3;

FIG. 5 is an exploded sectional elevational view of the knife-like shank portion of the workman's tool taken along line 5—5 of FIG. 3;

Figure 6:
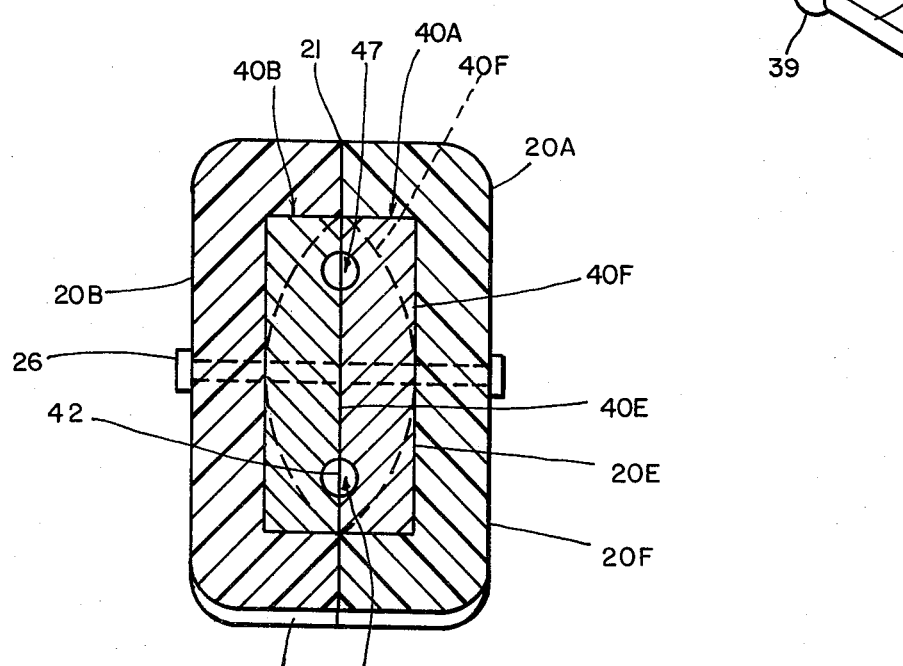

FIG. 6 is a transversely extending sectional elevational view taken along line 6—6 of FIG. 2; and FIG. 3 is a longitudinally extending elevational view taken along lines 3—3 of FIGS. 4, 5, and 6.

Figure 1:
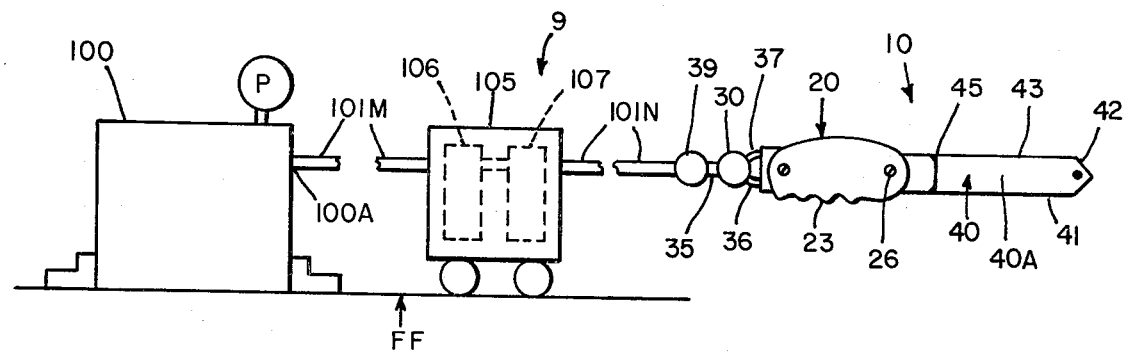
FIG. 1 is a schematic view of a representative embodiment of the apparatus including portable tool for cutting animal carcasses by impinging air jets.
Figure 1A:
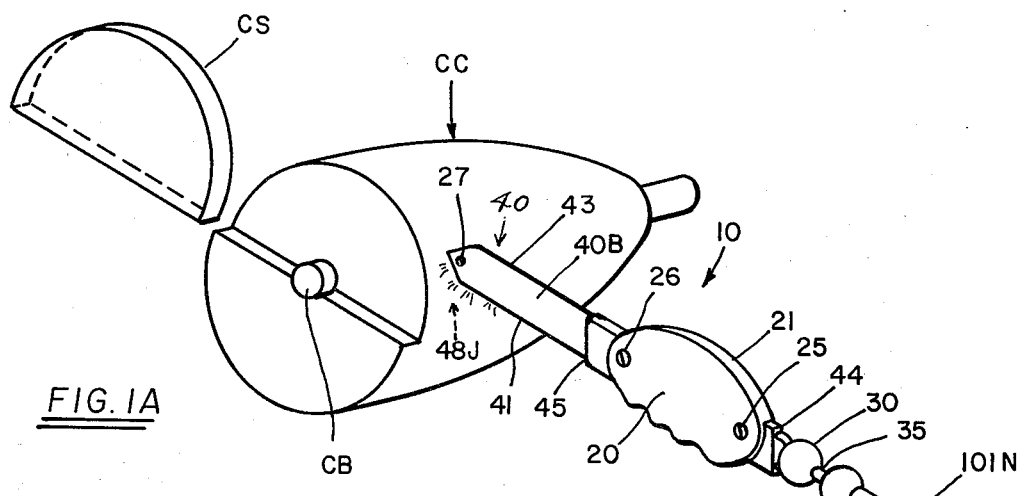
FIG. 1A is a schematic view showing one manner by which the apparatus embodiment of FIG. 1 might be employed for cutting away a relatively large portion of the animal carcasses.

An appreciation of the general construction and operations of the air jets carcasses cutting apparatus of the present invention can be secured through recourse initially to drawing FIGS. 1, 1A, and 2. Representative apparatus embodiment 9 generally comprises: a portable and deftly maneuverable workman's tool 10 having a manually graspable handle 20 and an elongate shank 40 of knife-like shape extending longitudinally forwardly of handle 20 along tool-axis 19. Shank 40 has a carcass addressing peripheral edge 41-43, herein including elongate lead-edge 41 and elongate trail-edge 43 substantially parallel to each other and also to tool-axis 19. The shank peripheral edge has at least one, and preferably a plurality of regularly spaced tiny orifices e.g. 48-49. It is through such orifices 48-49 through which high pressure air jets 48J and 49J are emitted of such intensity as to impinge upon the animal carcasses e.g. "CC", and cut therefrom large boneless ("CB") non-comminuted chunks or portions e.g. "CS". The compressed air supplying the air jets 48J and 49J originate remotely upstream of tool 10 at an air compressor/reservoir 100 having a pressure gage/regulator "P" and and outlet-port 100A for emergence of the airstream at an arbitrarily selectable high pressure. There are flexible elongate conduit means 101 having its inlet-end removably attached to the air compressor/reservoir outlet-port 100A and having its downstream outlet-end removably attached to the air inlet-port e.g. 35, of workman's tool 10 whereby the airstream originating at outlet-port 100A is eventually vented as the air jets 48J or 49J, or both. Preferably, the elongate conduit means 101 is of two elongate sub-lengths 101M and 101N, there being an intervening console 105 rollable along the factory floor "FF". Within console 105 are filtering means 106 and preferably also desiccant means 107, the latter means being employed to extract water from the airstream. It is the purpose of the filtering means 106 to remove from the airstream solids having a particle size exceeding about one-half the orifice-diameter for tiny orifices 48 and 49.

Continuing to refer to FIGS. 1, 1A, and 2, it can be appreciated that the high pressure air jets 48J, 49J, or both, emerging from the periphery 41-43 of knife-like shank 40 will impinge upon and hence remove relatively large and non-comminuted boneless portions e.g. "CS" from animal carcasses "CC". The carcass severing will result though the shank peripheral edges 41-43 are honed and indeed not necessarily make actual physical contact with the carcass, it being the high pressure air jets 48J and 49J impinging upon the carcass which do the carcass removal into portions such as "CS".

The airstream passageway necessarily extends internally of the knife-like shank 40 for downstream termination at orifices 48-49 of the shank periphery 41-43. It is preferred that there be a plurality of regularly spaced tiny orifices along the shank lead-edge 41 and also along the trail-edge 43 and that for the conservation of air pressure and for workman safety that the airstream by controllably directable, as by tool-valve 30 and tubing 36-37, to proceed alternatively to the orifices 48 of lead-edge 41 to the exclusion of orifices 49 of trail-edge 43, or vice versa. Moreover, the tool-valve 30 should have the capability that for certain interim periods, the airstream will not proceed to any of the orifices 48–49, or simultaneously to both sets of orifices. In this vein, the airstream might terminate downstream as two independent sub-paths 46 and 47, effected by tool-valve 30 and tubing 36-37, each sub-path 46 and 47 being ultimately branched to terminate at a plurality of said orifices 48 or 49. For optimum cutting or carcass portions, the orifice-diameter for orifices 48 and 49 should be as small as possible to maximize the intensity of the air jets 48J–49J, and in no event should exceed one millimeter. Moreover, the orifices-diameters should be subtantially equal and at regular spacing within he range of two to six multiples of the selected orifice-diameter.

For ease of fabrication, maintenance, and interim cleaning of the knife-like shank 40, said shank is best provided of two blade-like sub-parts 40A and 40B which are removably fastened together as by screws 25-27 passing through transversely extending threaded perforations 40G, 40H, and 40K, respectively. In this regard, and referring now to FIGS. 3-5, shank 40 desireably comprises two mirror image sub-parts 40A and 40B both having a planar upright inside-surface 40E which two surfaces 40E very tightly abut each other when sub-parts 40A and 40B are assembled e.g. with fasteners 25-27. The outside-surface 40F forwardly of chamfer-line 45 for each sub-part 40A and 40B is generally convex and these convex surfaces merge at peripheral edges 41-43. Each blade-like sub-part 40A and 40B provides one-half of shank edges 41-44, one-half the contour of circular orifices 48-49, and one-half the contour of the circular sub-paths 46 and 47. More specifically, each of the sub-parts 40A and 40B at inside-surface 40E is provided with semi-circular grooves 46A and 47A, respectively, and 46B and 47B, respectively, and parallel to tool-axis 19. At the shank rear-end 44, semi-circular grooves 46A and 46B at their entry-ends 46C together mateably define a circular entry-end for lead-path 46, while semi-circular grooves 47A and 47B at their entry-ends 47C together mateably define a circular entry-end for trail-path 47. Forward ends of independent sub-paths 46 and 47 terminate as spatially separated forward-ends 46D and 47D, respectively. Thus, airstream permitted to enter lead-path 46 will need to emerge through orifices sets 48 as air jets 48J, while airstreams permitted to enter trail-path 47 will need to emerge through orifices sets 49 as air jets 49J.

It is the function of the appropriately stationed tool-valve e.g. conventional three-way valve 30, to controllably direct the airstream coming from conduit 101 to proceed alternatively to one of the two sub-paths to the exclusion of the other sub-path 46 or 47, though sometimes operationally appropriate to both sub-paths simultaneously, and to neither sub-path between carcass cutting operations. Herein, three-way valve 30, having manual control element 31, has one tube 36 communicating with lead-path 46 at 46C and second tube 37 communicating with trail-path 47 at 47C, the airstream from conduit 101 entering valve 30 through entry-tube 35. As indicated by the four selectable conditions for manually positionable control element 31 in FIG. 2, the airstream might emit as jets 48J only, or as jets 49J only, or as both jets 48J–49J, or the airstream not permitted to proceed past valve station 30, the selection being dependent upon the carcass task presented to the workman.

It is important that the portable maneuverable tool 10 be freely turnable about tool-axis 19 and in this regard flexible non-kinking conduits 101N are preferred. Moreover, a swivel joint e.g. 39, might be employed at the juncture of entry-tube 35 and conduit 101N.

Analagously as for shank 40, tool handle 20 might be aptly provided of two sub-components 20A and 20B which can be removably secured as by said fasteners 25-26. The sub-components upright interior surfaces 20E mateably conform to shank outside-surfaces 40F between shank rear-end 44 and chamfer-line 45 whereby the handle rear-end 24 and forward-end 22 are similarly longitudinally confined. The handle underside 23 might be contoured for grasping by the workman's fingers, while the workman's palm would be nearer handle top-edge 21 of outside surface 20F.

From the foregoing, the construction and operation of the apparatus and tool for cutting animal carcasses by air jets will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. Apparatus for removing hides, select cuts of meat, and other relatively large portions of animal carcasses in cleanly-cut non-comminuted condition, said apparatus comprising:
   A. an air-compressor including an outlet-port for the emergence of the high pressure compressed air;
   B. an elongate flexible conduit extending downstream of the air-compressor for conducting the compressed air as an airstream, the flexible conduit having an inlet-end removably attached to the air-compressor outlet-port and having an outlet-end removably attached to an inlet-port of a portable workman's tool;
   C. said workman's tool comprising;
      i. a rearward handle wieldable by the workman;
      ii. an elongate shank attached to and extending forwardly of the handle, said shank at its peripheral edge being provided with at least one orifice having an orifice-diameter not exceeding one millimeter;
      iii. an airstream passageway extending from the inlet-port and at least partially extending along the shank interior and terminating at said at least one orifice, and
      iv. a manually actuatable tool-valve accessible to the handle and for controlling the airflow rate along said airstream passageway;
   D. filtering means located upstream of said workman's tool for filtering from the airstream solids having a particle size exceeding about one-half the orifice-diameter; and
   E. desiccating means located upstream of said workman's tool for desiccating the airstream before it enters the tool inlet-port.

2. The apparatus of claim 1 wherein the elongate shank is relative thin and narrow so as to have a knife-like shape including an elongate lead-edge and an elongate trail-edge peripherally; and wherein there is a plurality of orifices along the shank periphery, the airstream passageway being appropriately terminally branched and terminating at a plurality of said orifices.

3. The apparatus of claim 2 wherein there is a plurality of orifices positioned along the shank lead-edge and also along the shank trail-edge; and wherein the airstream passageway commencing at the tool-valve is bifurcated into two sub-paths including a leadpath and a trail-path, the lead-path extending to the orifices of the lead-edge and to the exclusion of orifices of the trail-edge, and the trail-path extending to the orifices of the trail-edge and to the exclusion of orifices of the lead-edge.

4. The apparatus of claim 3 wherein the tool inlet-port is at an entry-tube for the tool-valve; and wherein the tool-valve is capable of controllably directing the airstream to proceed alternatively along either one of the two sub-paths.

5. The apparatus of claim 4 wherein there is a plurality of regularly spaced orifices along at least one of the two shank elongate edges, the orifice-diameter of said orifices being substantially equal and the regular spacing being within the range of two to six multiples of the selected orifice-diameter.

6. The apparatus of claim 1 wherein there is an entry-tube for the tool-valve and defining the tool inlet-port; wherein there is a swivel connection between the conduit outlet-end and said entry-tube; and wherein the filtering means and the desiccating means are located within a rollable console attached to an intermediate length of the elongate flexible conduit.

7. The apparatus of claim 1 wherein the elongate shank is of knife-like shape including a pair of thinly separated broad surfaces merging at narrowly separated lead-edge and trail-edge peripheral portions of the elongate shank; and wherein there is a plurality of regularly spaced orifices along the shank lead-edge and trail-edge, the airstream passageway inside the shank terminating at said orifices, the orifice-diameter of said orifices being substantially equal and the regular spacing being within the range of two to six multiples of the selected orifice-diameter.

8. Portable and deftly maneuverable workman's tool for sub-dividing animal carcasses by high intensity air jets impinging upon the animal carcass, said workman's tool comprising;

i. a rearward handle deftly wieldable by the workman;

ii. an elongate knife-like shank attached to the handle and extending forwardly thereof along a longitudinal tool-axis, said shank peripherally including an elongate lead-edge and an elongate trail-edge respectively provided with a plurality of regularly spaced orifices, said shank being internally provided with at least one longitudinally extending internal airstream passageway ultimately terminating at said peripheral orifices, the airstream passageway inside the shank including a lead-path and a trail-path, the lead-path extending to the orifices of the lead-edge and to the exclusion of the orifices of the trail-edge, the trail-path extending to the orifices of the trail-edge and to the exclusion of orifices of the lead-edge;

iii. a manually actuatable tool-valve attached to the handle for selectively controlling airflow into the lead-path and trail-path of the shank internal passageway; and iv. an entry-tube attached to the tool-valve and to which the outlet-end of the elongate conduit might be removably attached, said entry-tube serving as an inlet-port for the introduction of compressed air into the workman's tool.

9. The workman's tool of claim 8 wherein the elongate shank is provided of two mateably abuttable blade-like sub-parts held together at upright inside-surfaces with a plurality of fastener means, each fastener extending transversely through both blade-like sub-parts remote of the shank internal passageway.

10. The workman's tool of claim 9 wherein the internal airstream passageway lead-path and trail-path are provided by contours of the sub-parts inside-surfaces; wherein orifices have an orifice-diameter not exceeding one millimieter, said orifices regular spacing being within the range of two to six multiples of the selected orifice-diameter; and wherein a first-tube from the tool-valve communicates with the shank internal lead-path and a second-tube from the tool-valve communicates with the shank internal trail-path.

* * * * *